United States Patent [19]

Fricker et al.

[11] 4,418,724

[45] Dec. 6, 1983

[54] HEAT INSULATING CASING

[75] Inventors: Wolfgang-Peter Fricker, Freinsheim; Manfred Scholz, Erlangen, both of Fed. Rep. of Germany

[73] Assignees: Kraftwerk Union Aktiengesellschaft, Mulheim an der Ruhr; Grünzweig & Hartmann Montage GmbH, Ludwigshafen, both of Fed. Rep. of Germany

[21] Appl. No.: 253,565

[22] Filed: Apr. 13, 1981

[30] Foreign Application Priority Data

Apr. 15, 1980 [DE] Fed. Rep. of Germany ....... 3014453
Mar. 10, 1981 [DE] Fed. Rep. of Germany ....... 3049871

[51] Int. Cl.³ ............................................. F16L 59/14
[52] U.S. Cl. .................................... 138/149; 428/149; 428/448; 428/450
[58] Field of Search ....................... 138/149, 158, 159; 428/80, 149, 448, 450; 220/DIG. 9; 285/45, 47

[56] References Cited

U.S. PATENT DOCUMENTS

| Re. 28,930 | 8/1976 | Johnson | 138/149 X |
| 1,613,725 | 1/1927 | Sabin | 138/149 X |
| 3,557,840 | 1/1971 | Maybee | 138/149 |
| 3,628,572 | 12/1971 | Shannon | 138/149 X |
| 4,183,379 | 1/1980 | Marquette et al. | 138/149 X |

FOREIGN PATENT DOCUMENTS

| 1537122 | 7/1968 | France | 138/149 |
| 2461192 | 1/1981 | France | 138/149 |

Primary Examiner—James E. Bryant, III
Attorney, Agent, or Firm—Herbert L. Lerner; Laurence A. Greenberg

[57] ABSTRACT

Heat insulating casing for structural components having curved surfaces, including insulating plates formed of compressed material based on pyrogenic silica, reinforcement fibers and on an opacifier, the insulating plates being divided into insulating elements having trapezoidal cross sections, and the insulating elements being combined to form a polygonal insulating shell.

15 Claims, 12 Drawing Figures

U.S. Patent   Dec. 6, 1983   Sheet 1 of 3   4,418,724
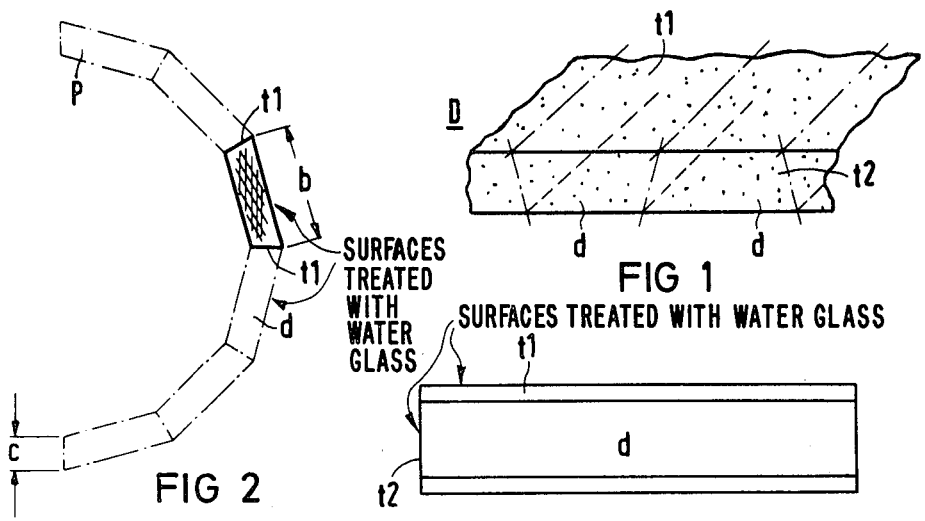
FIG 1
FIG 2
FIG 3
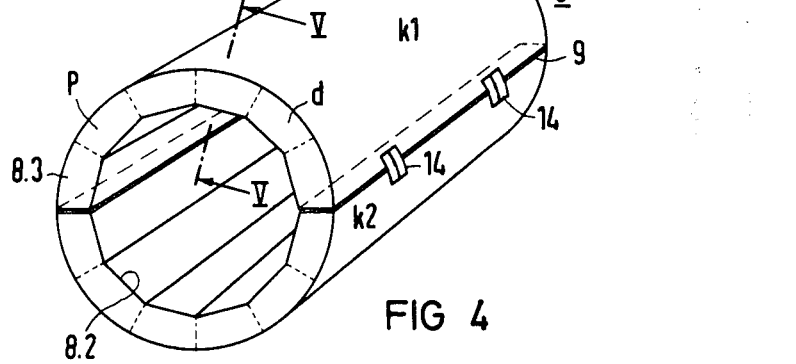
FIG 4
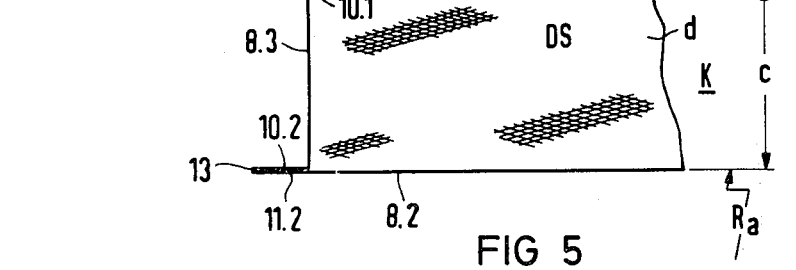
FIG 5

HEAT INSULATING CASING

The invention relates to a heat insulating casing for structural components with curved surfaces, especially of the type used in conventional or nuclear power plants.

Heat insulating materials are on the market under the trademark "Minileit," for example. This is described, for example, in the data sheet "Technische Daten N 101, Schluesselzahl 10.10.78 K" of the firm Gruenzweig & Hartmann und Glasfaser AG. These are produced as purely inorganic, non-inflammable, finely porous plates with an excellent heat insulating capability. The heat-conductivity is lower than the conductivity of still air, and furthermore is only very slightly dependent on temperature. Even at high operating temperatures, only small insulating thicknesses are required. The known insulating material in the form of pressed plates formed of powdered $SiO_2$ base materials (pyrogenic silicic acid) with reinforcement fibers and an opacifying agent, can well sustain pressure on its surface. The glass fabric cover used in the pressing process remains on the surface of the insulating material as a surface protection and for better form stability.

However, the known heat insulating plates cannot be satisfactorily machined because of their glass fabric cover, so that they are generally manufactured in the required form in which they are installed.

It is accordingly an object of the invention to provide a heat insulating casing, which overcomes the hereinafore-mentioned disadvantages of the heretofore-known devices of this general type, and to create a heat insulating casing of the initially defined type, which can be used to reliably heat-insulate structural parts with curved surfaces, especially pipe lines, and pressure vessels in conventional or nuclear installations, wherein the heat insulating casing is essentially constructed of commercially available heat insulating plates formed of a pyrogenic silica base.

With the foregoing and other objects in view there is provided, in accordance with the invention, a heat insulating casing for structural components having curved surfaces, especially of the type used in conventional or nuclear power plants, comprising insulating plates formed of compressed material based on pyrogenic silica, reinforcement fibers and an opacifier, the insulating plates being divided into insulating elements having trapezoidal cross sections, and the insulating elements being combined to form a polygonal insulating shell.

In accordance with another feature of the invention, the insulating elements have surfaces where they have been divided from the insulating plates, and the surfaces are treated with water glass.

In accordance with a further feature of the invention, there is provided a moisture-proof sheet metal encapsulation disposed on the polygonal insulating shell.

In accordance with an added feature of the invention, the encapsulation is formed of austenitic steel sheets.

In accordance with an additional feature of the invention, the polygonal insulating shell is in the form of a tubular heat insulating casing for insulating structural components having substantially cylindrical peripheries such as pipelines or pressure vessels, the shell being divided into at least two half-shell casing parts defining parting gap regions and there is provided an inner steel shell covering the parting gap region, ring-shaped end plates, an outer steel shell, and a moisture-proof connection between the outer shell, inner shell and end plates.

In accordance with again another feature of the invention, the casing is round or polygonal and has corners formed therein.

In accordance with again a further feature of the invention, the moisture-proof connection is formed by a weld or folded edge seam.

In accordance with again an added feature of the invention, the outer shell is thicker than the inner shell, and the inner shell is thicker than the end plates.

In accordance with again an additional feature of the invention, the casing is formed of austinitic steel and the outer shell is 0.8 to 1 mm thick depending upon the diameter thereof, the inner shell is approximately 0.6 mm thick, and the end plates are approximately 0.4 mm thick.

In accordance with yet another feature of the invention, the casing parts are adjacent to each other in the parting gap region, and the connection is disposed in the longitudinal direction and there is provided a welded or rolled and welded overlap joint having a first overlap width for one of the casing parts (the lower part), and a welded bent or rolled and welded overlap joint having a second overlap width and an outer leg of the outer shell having an end for the other (upper) of the casing parts, the second overlap width and outer leg covering the joint or overlap connection of the one casing part, the second overlap width being greater than the first overlap width and the outer leg being in the form of a carrier for fastening elements for the connection and being turned back at the end thereof.

In accordance with yet a further feature of the invention, the one casing part has an edge of the outer shell tangentially bordering the other casing part, and there are provided fastening elements in the form of quick-acting clamping devices including a hingelock fastener disposed in vicinity of the joint or seam connection of the other of the casing parts and a locking latch plate disposed in vicinity of the edge region.

In accordance with yet an added feature of the invention, the one casing part has an edge region of the outer shell lying below the outer leg of the other casing part, and there are provided fastening elements in the form of sheet metal screws perforating the outer leg and the edge region.

In accordance with yet an additional feature of the invention, a given one of the half-shell parts is a lower part and the other is an upper part in vicinity of one of the parting gap regions, and the given one of the half-shell parts is an upper part and the other of the parts is a lower part in vicinity of another of the parting gap regions forming parts of identical configuration.

In accordance with a concomitant feature of the invention, the one casing part is a lower part and the other casing part is an upper part.

Other features which are considered as characteristic for the invention are set forth in the appended claims.

Although the invention is illustrated and described herein as embodied in heat insulating casing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary, diagrammatic, perspective view of the heat insulating casing of the invention showing the division of a pressed insulating plate into individual, trapezoidal-shaped insulating strips;

FIG. 2 is a side elevational view of the combination of several insulating strips to form a polygon-shaped insulating module;

FIG. 3 is a plan view of an individual insulating strip;

FIG. 4 is a perspective view of a shell-shaped insulating module formed by sheet metal encapsulation of the polygon-shaped insulating elements;

FIG. 5 is a fragmentary view of the sheet metal or metal foil connection taken along the line V—V in FIG. 4, in the direction of the arrows;

Figure 10:
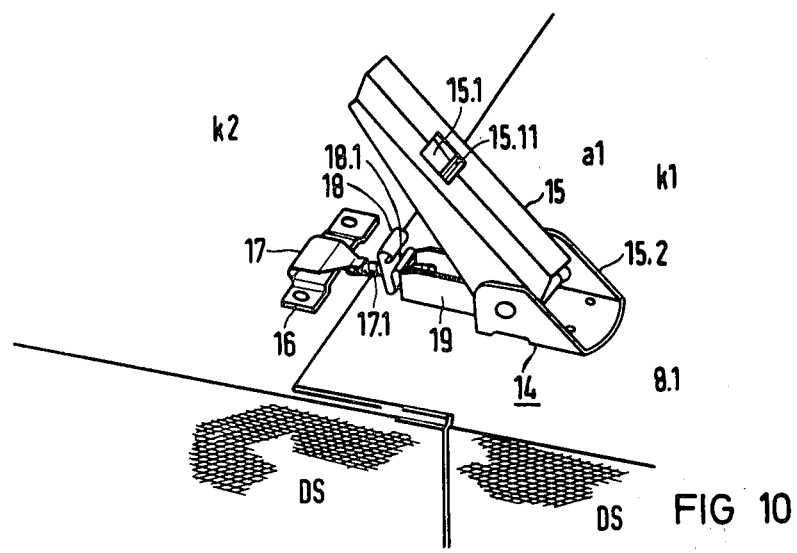
FIG. 10 is a perspective view of a part of a quick-acting clamping lock forming the connecting element in the region of the longitudinal seam.
Figure 11:
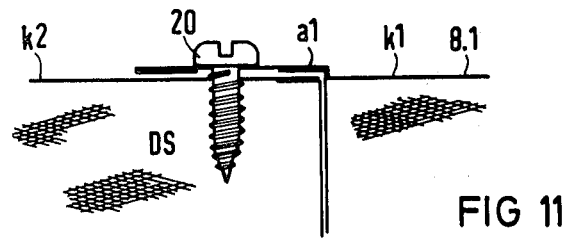
Figure 12:
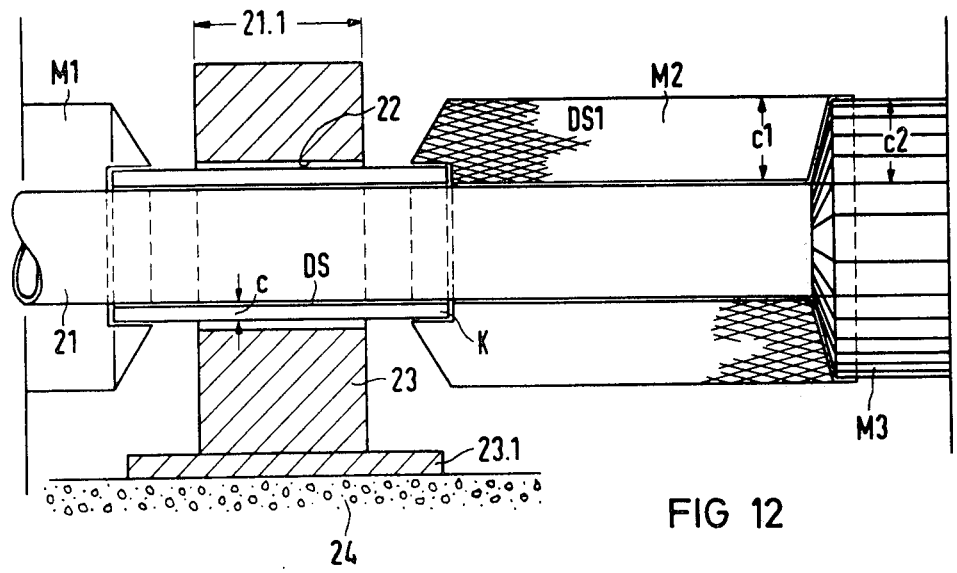

FIG. 11 is a view similar to FIG. 10, of a sheet metal screw forming the connection element in the vicinity of the longitudinal seam; and FIG. 12 is a partially cross-sectional view of a pipeline in a nuclear power plant in the region of a deflection-safety arrangement that is surrounded by a heat insulating casing according to the invention, and otherwise is provided with conventional heat insulation which can be partly removed and is partly permanently fixed.

Referring now to the figures of the drawing and, particularly, to FIG. 1 thereof, there is seen an insulating panel or plate D which is formed of a pressed material of pyrogenic silicic acid or silica, reinforcement fibers, and an opacifier in a known manner, and which has a gross weight density of at least 250 kg/m$^2$. The plate D is divided into insulating strips d with approximately trapezoidal cross-sections. This is done for producing a heat insulation for construction parts having a curved surface, wherein the longitudinal sides $t_1$ of the insulating strips are rectangular, and the end faces $t_2$ thereof are trapezoidal. After the division which is carried out in practice with a band saw, the surfaces $t_1$ and $t_2$ are treated with water-glass, thereby protecting the cutting edges from crumbling-off.

FIG. 2 shows that the insulating strips d, individually shown in FIG. 3, can be assembled to form a polygon-shaped shell P by placing the longitudinal surfaces $t_1$ thereof against each other. In FIG. 2 only a half-shell arch is shown. The separating surfaces which were treated with water-glass are again designated with reference characters $t_1$ and $t_2$ in FIGS. 2 and 3. A compass saw is used to produce non-illustrated feed-through perforations. It can be seen from FIG. 1 in conjunction with FIG. 2 that because of the alternating slant of the surfaces $t_1$ toward one side or the other side, the insulating strips d can be manufactured with practically no waste or loss. This produces insulating strips of uniform cross section from which the polygon-shaped shell P can be assembled with individual insulating strips d having a width b and an insulating thickness c.

According to FIG. 4, the polygon-shaped shell P is provided with a moisture-proof metal encapsulation 8, so that essentially a hollow-cylindrical insulating casing K is formed, which is especially suited for the heat insulation of pipe lines, and which can be subdivided by an axial parting gap 9 into two half-shell shaped casing parts $k_1$, $k_2$. This provides a removable assembly that can be refitted, on which the casing parts are held together in the region of the parting gap 9 by clamping elements 14 that will be further described hereinbelow. For the heat insulation of pipelines and components in power plants, especially nuclear power plants, an encapsulation of austenitic, non-rusting sheet steel 8 is recommended.

The heat insulating casing K shown in FIG. 4, has a round outer sheet metal cover 8.1, a polygonally cornered inner sheet metal cover 8.2 which preferably also covers the parting gap zone 9, and is also provided with ring-shaped sheet metal end plates 8.3. The end plates 8.3 are round at their outer periphery and polygonally cut at their inner periphery, so that suitable bent edge projections 10.1 and 10.2 are provided at the outer and inner peripheries of the end plates 8.3 as seen in FIG. 5. The outer edge projections 10.1 are moisture-tight or damp-proof and are also preferably gas-tightly connected with a corresponding edge projection 11.1 of the outer plate 8.1 by a scarf joint in the form of a so-called casing seam, whereby an extended leg of the edge projection 11.1 reaches around the edge projection 10.1 in a U-shape, and is squeezed together therewith. The edge projection 10.2 at the inner periphery of the end plate 8.3 is connected in such a way as to be damp-proof and preferably also gas-tight with the edge projection 11.2 of the outer plate 8.2 which surrounds it by a rolled welding seam 13. In FIG. 5, the insulating thickness is again designated by reference character c, and the insulating strip with d, while the insulating material is designated with DS, and the outer diameter of the pipe which is to be insulated with $R_a$ (the pipe itself not being shown). To achieve the best form stability of the heat insulating casing K with the smallest possible heat conduction of the encapsulation 8, it is advantageous to dimension the gage of the outer steel shell 8.1 larger than the gage of the inner shell 8.2 and to make the gage of the inner shell 8.2 larger than the gage or thickness of the end plates 8.3. With an austenitic steel encapsulation, depending on its diameter, suitable values for the strength of the outer steel encapsulation have been 0.8 to 1 mm, for the thickness of the inner steel shell 8.2 approximately 0.6 mm, and for the thickness of the end plates 8.3 about 0.4 mm. The moisture-tight connection between the end plate 8.3 and the outer and inner steel shells 8.1, 8.2 at the other end of the heat insulating casing K which is not visible in FIG. 4 is formed in a similar manner to the connection shown.

Figure 6:
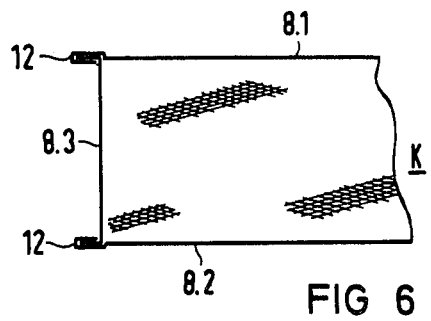
FIG. 6 is a view similar to FIG. 5 showing a second embodiment of the sheet metal connection for moisture-proof encapsulation of a casing according to FIG. 4.
Figure 7:
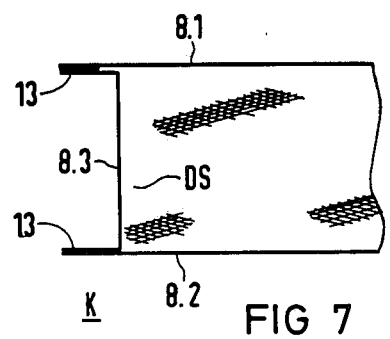
FIG. 7 is a view similar to FIG. 6 of a third embodiment of a sheet metal connection for the moisture-proof encapsulation according to FIG. 4.

FIG. 6 shows that this connection can be made as a casing seam 12, not only at the outer shell 8.1, but also at the inner shell 8.2. FIG. 7 shows a further variation with a rolled welding seam 13, not only at the inner steel shell 8.2, but also at the outer shell 8.1.

Figure 8:
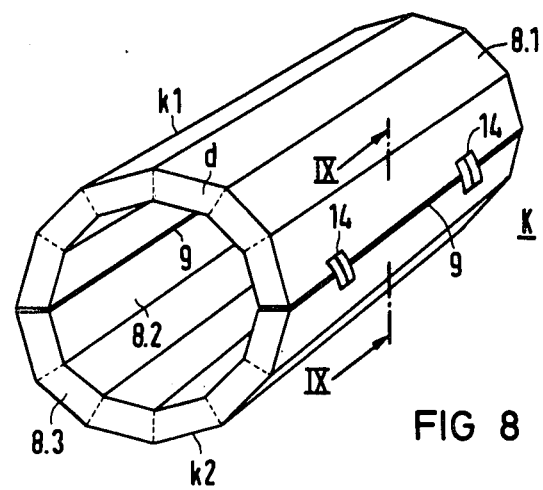
FIG. 8 is a view similar to FIG. 4 of a heat-insulating casing wherein, deviating from FIG. 4, the outer periphery is not round but instead has corners like the inner surfaces.

The heat insulating shell K, according to FIG. 8 differs from the one shown in FIG. 4 by the feature that not only the inner shell 8.2, but also the outer shell 8.1 are made with polygonal corners. This construction is recommended for pipes with smaller diameters which are to be insulated, in order that air spaces can be formed in the wedge-like spaces between the insulating strips d and the inner circumference of the outer shell 8.1.

Figure 9:
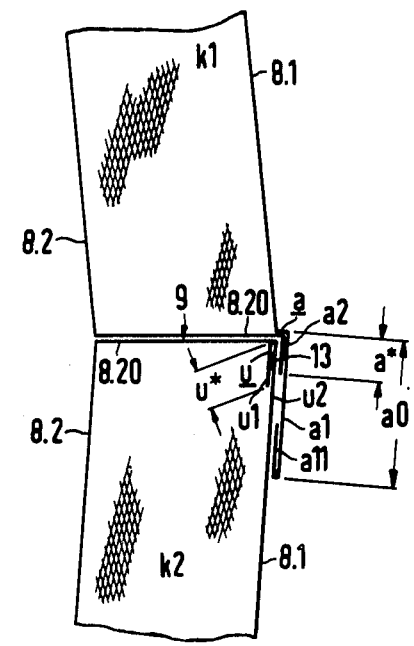
FIG. 9 is an enlarged fragmentary view showing the continuation of the region of the longitudinal seam of the connection, taken along the IX—IX in FIG. 8, in the direction of the arrows.

FIG. 9 which is another view of FIG. 8, shows the longitudinal seam connection of the casing parts k1, k2 which are joined in the region of the parting gap 9. One casing part k2, in this case the lower casing part, has a connection represented by a simple welded, and in particular a rolled and welded, overlap joint u with an overlap width u*. One overlapping leg u1 is a bent elongation of a bend 8.20 which reaches or extends over the parting gap region 9 of the inner steel shell 8.2, and the other overlapping leg is formed by the outer shell 8.1. The rolled welding seam is again designated with reference character 13. The longitudinal seam connection a of the other casing part k1, in this case referred to as the upper casing because it overlaps the lower casing part k2, is constructed as a bent overlapping joint which is also welded, and in particular rolled and welded, and covers the longitudinal seam connection u1, u2 of the lower casing k2 with its outer leg a1. Therefore, the width a0 of the overlapping leg a1 of the outer shell 8.1 is many times greater than the overlapping width a*, as shown. The overlapping leg a1 is turned over at its free end by a bend a11, so that a large area contact is provided for the overlapping leg a1 at the lower casing part k2. Furthermore, in the longitudinal seam connection a1, 12 of the upper casing k1, the overlapping leg a2 is a bent elongation of a bend 8. 20 of the inner shell 8.2 which covers the parting gap region 9.

FIG. 10 shows an embodiment of the closures designated with reference character 14 in FIGS. 4 and 8, which is in particular a so-called quick-acting clamping lock. In the region of the overlapping leg a1 of the outer shell 8.1 of an outer casing, a swing-lock 15 with a perforation 15.1 for a latch, is hingeably supported in a bracket 15.2. In the opposite adjacent region of the lower casing part k2, a latch plate 16 is fastened. A hook 17 with a latch 18 which is adjustable on a threaded stud 17.1, is secured on the plate 16. Guide walls for the swing lock 15 and the latch 18 are designated by reference character 19. The latch which is elastically deformable engages with its catch 18.1 behind the edge 15.11 of the perforation 15.1.

FIG. 11 shows a sheet metal screw 20 in a section for the same longitudinal seam connection region between the lower casing k2 and the upper casing k1, which perforates the outer leg a1 of the outer shell 8.1 of the upper casing k1, and the outer shell 8.1 of the lower casing k2 in a hole. The longitudinal seam connection according to FIG. 11 is suited for smaller casings with lesser tension forces, such as for casings where a frequent removal and re-installation is not important.

For constructing the two casing-parts k1, k2 in the same way so as to be identical, the parts are alternatingly constructed in one parting gap region as the upper casing part, and in the other parting gap region as the lower casing part. Thus, for the right parting gap region 9 shown in FIG. 8 according to the section shown in FIG. 9, as explained, the casing part k1 is the upper casing part, and the casing part k2 is the lower casing. For the parting gap region 9 shown at the left side in FIG. 8, the opposite is the case, i.e. k2 is the upper casing part and k1 is the lower casing part, which can be easily understood if one turns the drawing of FIG. 9 upside down and exchanges the reference characters k1 and k2.

FIG. 12 shows the pipeline 21 which may, for example, be a live steam line from a steam generator that perforates a hole 22 in the axial tube region 21.1 of a deflection limiting element 23 of an arrangement which keeps deflection within safe limits. The arrangement itself is anchored with a base part 23.1 at the foundation, or at a wall of steel-concrete. In the region 21.1 of the arrangement 23 which limits deflection, and extending slightly beyond it on both sides, the pipeline 21 is surrounded by a heat insulating casing K, as it was described in the preceding text with the aid of FIGS. 4 and 5, and 6 to 11. The heat insulating casings M1 and M2 are axially adjacent to the heat insulating casing K and interlocked therewith so that the casing M2 can be removed and re-installed. The casings M1 and M2 are also encapsulated in austenitic steel, but contain a conventional insulating material DS1 made of mineral wool, the density of which is much smaller than the density of the insulating material DS of the casing K. To obtain the same heat insulation, the insulating thickness c1 of the casings M1 and M2 is several times greater than the insulating thickness of the casing K. Correspondingly, the same applies for the insulating thickness c2 of heat-insulation M3 which is installed so as to be axially fixed with respect to the casing M2. It has been found that by the use of the high grade insulating material DS, depending on the temperature range, only one half to one sixth of the insulating thickness is required in comparison to the conventional heat insulation of casings K1, M2. Because the new heat insulating material DS has a very high compressive strength, the casing K which is made of this material can serve to transfer forces from the pipe to the deflection limiter 23 in the region of the deflection limiting arrangement. Thus, the travel path of the pipe 21 which is secured with respect to its deflection, or of some other part so secured, is almost zero. Through the use of this compact insulating material DS, the supporting structure which is a solid member with normal heat insulations with lesser compact insulating material of mineral wool, can be omitted for systems constructed with DS. Additional heat-bridges are thereby avoided and the heat flow is further limited. The heat insulating bodies and the heat insulating casings according to the invention, increase the safety of installations with pipelines and components conducting pressurized media, especially in power plants and nuclear power plants for the following reason: If the insulating material would be washed out by a water or steam jet (in the case of a major leak, which is quite unlikely), which damages the heat insulation, the filters of the back-cooling system could not become plugged (because of the small size of the insulating material-particles in the $\mu$ region). Furthermore, the following advantages of insulating systems which are equipped with the insulating material according to the invention should be noted: Reduction of the heat losses and heat radiation into the buildings of the installation, resulting in energy savings and less heat pollution of the environment. Concrete and steel can be effectively protected against over-heating even where space is limited. Because of the herein-described moisture-proof construction of the casings, problems of dust generation and decontamination at nuclear power plants are solved. Beyond that, it is possible to remove and to re-install the heat insulation with very little time expenditures. The outstanding ruggedness of the heat insulating system against mechanical loads have already been explained. Depending on the construction of the insulating material, a heat insulating system according to the invention can sustain a pressure load above 1000 N/cm².

The construction of heat insulating casings which are formed of more than two casing parts also lies within the scope of the invention. This is especially necessary for applications in which the components to be heat insulated have curved surfaces with a larger diameter.

There is claimed:

1. Heat insulating casing for structural components having curved surfaces, comprising insulating plates formed of compressed material based on pyrogenic silica, reinforcement fibers and an opacifier, said insulating plates being divided into insulating elements having trapezoidal cross sections, said insulating elements being combined to form a polygonal insulating shell, said polygonal insulating shell being in the form of a tubular heat insulating casing for insulating structural components having substantially cylindrical peripheries, said shell being divided into at least two half-shell casing parts defining parting gap regions and including an inner steel shell, ring-shaped end plates, an outer steel shell, and a moisture-proof connection between said outer shell, inner shell and end plates.

2. Heat insulating casing according to claim 1, wherein said insulating elements have surfaces where they have been divided from said insulating plates, and said surfaces are treated with water glass.

3. Heat insulating casing according to claim 1 or 2, including a moisture-proof sheet metal encapsulation disposed on said polygonal insulating shell.

4. Heat insulating casing according to claim 3, wherein said encapsulation is formed of austenitic steel parts.

5. Heat insulating casing according to claim 1, wherein said casing is round.

6. Heat insulating casing according to claim 1, wherein said casing is polygonal and has corners formed therein.

7. Heat insulating casing according to claim 1, wherein said moisture-proof connection is formed by a folded edge seam.

8. Heat insulating casing according to claim 1, wherein said moisture-proof connection is formed by a weld.

9. Heat insulating casing according to claim 1, wherein said outer shell is thicker than said inner shell, and said inner shell is thicker than said end plates.

10. Heat insulating casing according to claim 9, wherein said casing is formed of austenitic steel and said outer shell is 0.8 to 1 mm thick depending upon the diameter thereof, said inner shell is approximately 0.6 mm thick, and said end plates are approximately 0.4 mm thick.

11. Heat insulating casing according to claim 1, wherein said casing parts are adjacent to each other in said parting gap region, and said connection is disposed in the longitudinal direction and includes a welded overlap joint having a first overlap width for one of said casing parts, and a welded bent overlap joint having a second overlap width and an outer leg of said outer shell having an end for the other of said casing parts, said second overlap width and outer leg covering said joint of the one casing part, said second overlap width being greater than said first overlap width and said outer leg being in the form of a carrier for fastening elements for said connection and being turned back at said end thereof.

12. Heat insulating casing according to claim 11, wherein the one casing part has an edge of said outer shell bordering the other casing part, and including fastening elements in the form of quick-acting clamping devices including a hinge-lock fastener disposed in vicinity of said joint of the other of said casing parts and a locking latch plate disposed in vicinity of said edge region.

13. Heat insulating casing according to claim 11, wherein the one casing part has an edge region of said outer shell lying below said outer leg of the other casing part, and including fastening elements in the form of sheet metal screws perforating said outer leg and said edge region.

14. Heat insulating casing according to claim 1, 9, 10, 11, 12 or 13, wherein a given one of said half-shell parts is a lower part and the other is an upper part in vicinity of one of said parting gap regions, and said given one of said half-shell parts is an upper part and said other of said parts is a lower part in vicinity of another of said parting gap regions forming parts of identical configuration.

15. Heat insulating casing according to claim 11, wherein the one casing part is a lower part and the other casing part is an upper part.

* * * * *